March 22, 1955     O. E. HUSE     2,704,625
BERRY PICKERS' BOX
Filed Oct. 4, 1950     2 Sheets-Sheet 1
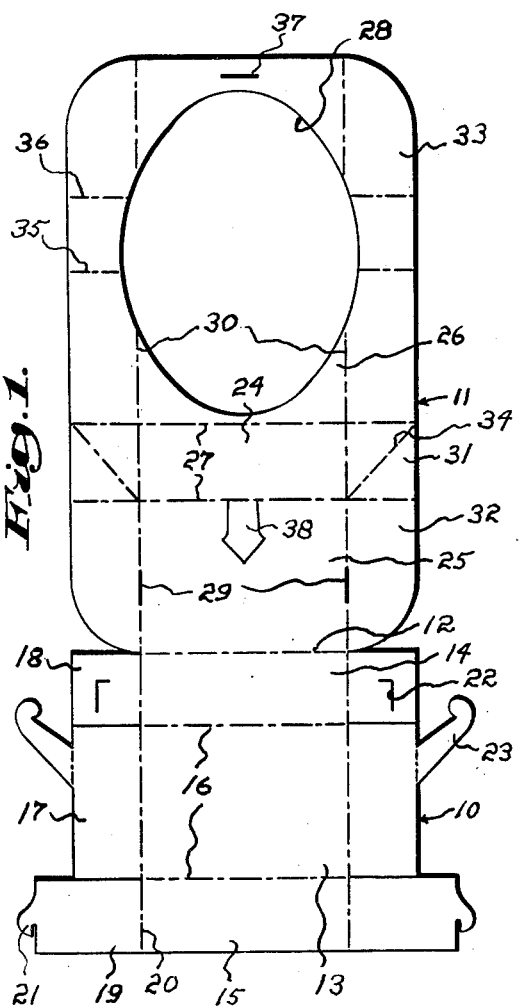
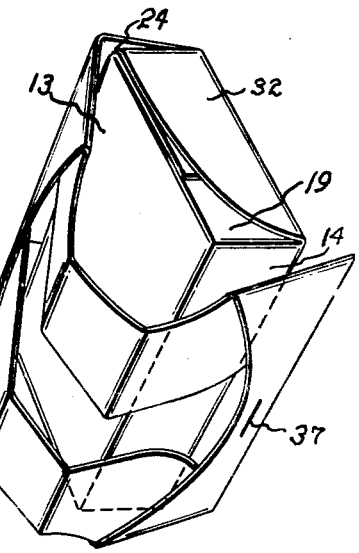
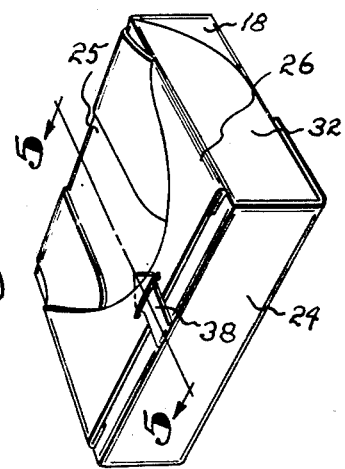
Inventor:
Oscar E. Huse,
by Abbott Spear
Attorney March 22, 1955     O. E. HUSE     2,704,625
BERRY PICKERS' BOX
Filed Oct. 4, 1950     2 Sheets-Sheet 2
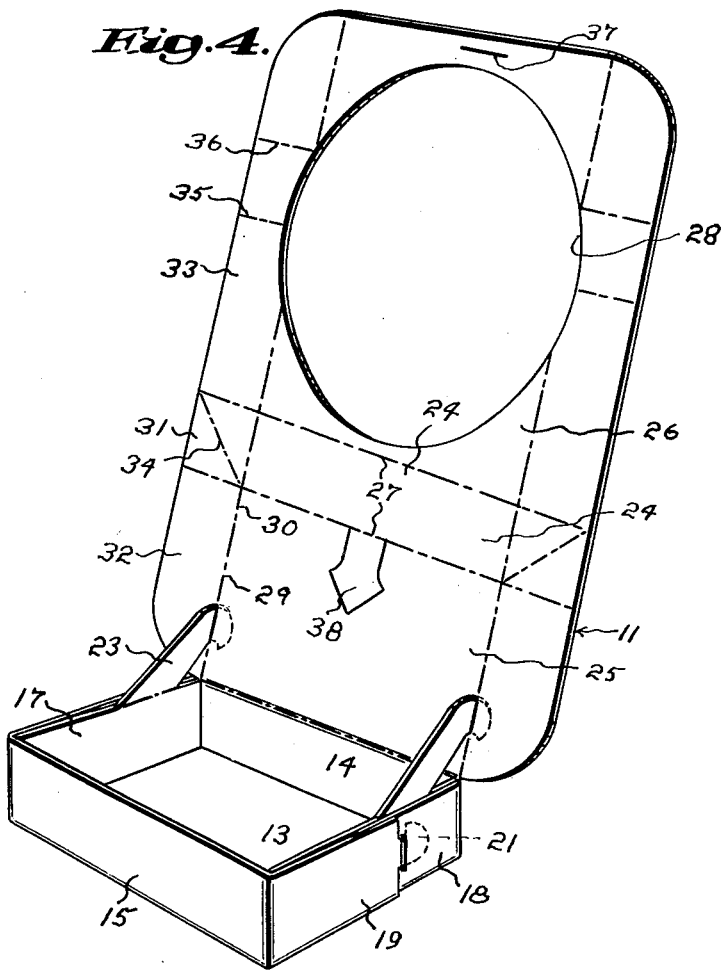
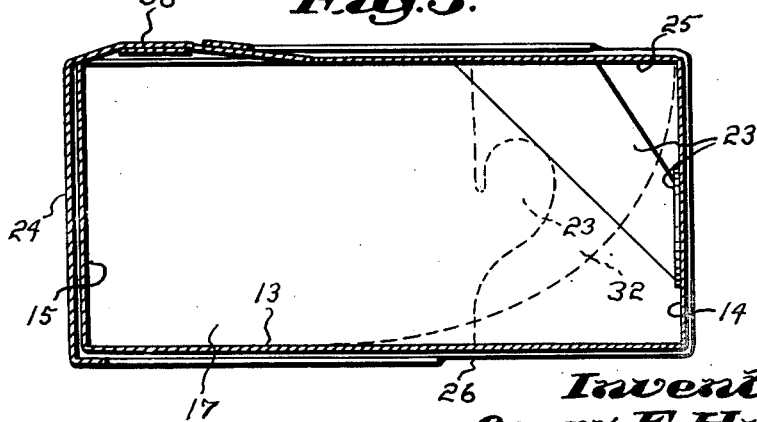
Inventor:
Oscar E. Huse,
by Abbott Spear
Attorney

United States Patent Office 2,704,625
Patented Mar. 22, 1955

2,704,625

BERRY PICKERS' BOX

Oscar E. Huse, Kents Hill, Maine

Application October 4, 1950, Serial No. 188,400

3 Claims. (Cl. 224—5)

My present invention relates to boxes particularly adapted to meet the requirements of berry pickers.

In picking berries, it is, of course, desirable to minimize their handling and at the same time it is often necessary to prepare them for shipment or storage and particularly frozen storage. To meet these requirements and to make the picking of the berries more convenient are the principal objectives of this invention.

In accordance with my invention, I provide a box for berry pickers which has a receptacle part and a second part attachable to the picker's person and constituting a receptacle supporting bib and which is of sufficient length to be wrapped around the receptacle to close it and to protect its contents. In order that the receptacle may be properly positioned when in use by the picker, I provide the receptacle and bib portion with detachable interlocking means.

In the accompanying drawings, I have shown an illustrative embodiment of my invention from which these and other of its novel features and advantages will be readily apparent.

In the drawings,

Fig. 1 is a plan view of one of my blanks from which the box shown in the other views is established, Fig. 2 is a perspective view of the box closed for shipment or storage, Fig. 3 is a like view but with the cover unlocked and the box inverted, Fig. 4 is a perspective view showing the box set up for use by a berry picker, and Fig. 5 is a section, on an enlarged scale, along the lines 5—5 of Fig. 2.

In Fig. 1, I have shown the blank from which the box of Figs. 2–5 is established. The blank is preferably of water-proofed cardboard stock and consists of integral portions, generally indicated at 10 and 11, and defined by a fold line 12.

The portion 10 includes a panel 13 separated from panels 14 and 15 by fold lines 16. The panels 13, 14, and 15 have extensions 17, 18, and 19, respectively, which are separate from each other and are defined by lines of fold 20. The panel 13 constitutes the bottom of the receptacle part of a box in accordance with my invention, the panels 14 and 15, the sides thereof, and the extensions 17 become its ends. In order that the receptacle part may be locked together when folded into its position of use, I have shown the extensions 19 as projecting beyond the extensions 18 and as having tabs 21 disposed to enter and lock in slits 22 in the extensions 18. I also provide each of the extensions 17 with an elongated tab 23 for reasons that will presently be apparent.

The portion 11 is shown as having a panel 24 separated from panels 25 and 26 by fold lines 27. In accordance with my invention, the portion 11 is of substantial length and the panel 26 has an aperture 28 dimensioned to receive the berry picker's head so that the portion 11 constitutes a bib. In order that the receptacle part may be properly supported when the portion 11 is used as a bib, I form the panel 25 with slits 29 which detachably receive the tabs 23 so that, in use, the receptacle is positioned as shown in Fig. 4.

In accordance with my invention, the portion 11, when the receptacle is to be closed, is wrapped around it and locked to itself. Because of the width of the panel 11 relative to the length of the established receptacle, I have shown the portion 11 as having fold lines 30 providing each of the panels 24, 25, and 26 with extensions 31, 32, and 33 respectively.

The panel 25 is dimensioned to serve as a cover for the receptacle while its extensions 32 may be disposed downwardly against its end walls. The panel 24 extends downwardly over the front side wall 15 and its extensions 31 each have a diagonal fold line 34 to enable the extensions 33 to fold flat against the panel 26.

I provide the panel 26 with fold lines 35 and 36 to enable the remainder of the panel 11 to be wrapped tightly around the receptacle with the slit 37 adjacent the extremity of the panel 26 caught and anchored by the locking tab 38 in the panel 25.

It will thus be apparent that my invention enables boxes well adapted to meet the needs of berry pickers to be economically produced. Because the portion 11 functions as a supporting bib for the receptacle, maximum convenience is afforded the berry picker as the receptacle is always accessible and both of the hands are free for use. When the receptacle is filled, it is quickly and easily closed to provide a package that both prevents spilling of the contents and access of insects thereto. In addition, the resulting package may be safely transported and is admirably suited for use in the frozen stage of the berries.

What I therefore claim and desire to secure by Letters Patent is:

1. A box for berry pickers, said box comprising a blank of foldable stock including first and second parts, said first part including a main portion and marginal portions foldable with reference to the main portion to establish end and side walls of a box-like receptacle, said second part including a main portion foldable with reference to one of said side walls to provide a cover for said receptacle and including laterally disposed portions foldable with reference to said cover to extend downwardly over the end walls of the receptacle and an extension attachable to the wearer, said extension having fold lines corresponding to the shape of the receptacle to enable it to be wrapped therearound to overlie said cover, and complemental means to interconnect said parts to establish a predetermined angular relation between their main portions, said means comprising a tab member constituting an integral part of each end wall of the receptacle and said cover having slits one for each tab member.

2. A box for berry pickers, said box comprising a blank of foldable stock including first and second parts, said first part including a main portion and marginal portion foldable with reference to the main portion to establish end and side walls of the box-like receptacle, said second part including a main portion foldable with reference to one of said side walls to provide a cover for said receptacle and including laterally disposed portions foldable with reference to said cover to extend downwardly over the end walls of the receptacle and an extension attachable to the wearer, said extension having fold lines corresponding to the shape of the receptacle to enable it to be wrapped therearound to overlie said cover, said main portion of said second part and said extension including complemental portions interengageable when said second portion is wrapped around said receptacle, and complemental means to interconnect said parts to establish a predetermined angular relation between their main portions.

3. A box for berry pickers, said box comprising a receptacle part including bottom, side, and end walls, and a second part integral with one side wall of said receptacle part and of such length that it may be wrapped completely around said receptacle, the width of said second part being greater than said side walls, said second part including a cover portion and an extremity having a head receiving aperture whose width is greater than the length of said side walls, said second part also having fold lines dividing it into a central part whose width is equal to the length of said side walls and into marginal parts which in said cover portion are disposable at right angles to lie against said end walls and which in said extremity are disposed inwardly against said central part, said cover portion having slits in the fold lines dividing it into central and marginal parts, and a locking tab integral with each end wall entrant of the proximate slit to maintain said receptacle part at an angle relative to said cover portion.

References Cited in the file of this patent

UNITED STATES PATENTS

| | | |
|---|---|---|
| 1,260,528 | Evans | Mar. 26, 1918 |
| 1,379,395 | Devlin | May 24, 1921 |
| 1,536,950 | Tinsley | May 5, 1925 |
| 1,970,307 | Hartmann | Aug. 14, 1934 |
| 1,979,632 | McClure | Nov. 6, 1934 |
| 2,023,852 | Oser et al. | Dec. 10, 1935 |
| 2,137,906 | Cummings | Nov. 22, 1938 |
| 2,265,690 | Fiedler | Dec. 9, 1941 |